(12) United States Patent
Roh et al.

(10) Patent No.: US 10,199,630 B2
(45) Date of Patent: Feb. 5, 2019

(54) ELECTRODE TERMINAL, ELECTRO-CHEMICAL DEVICE AND ELECTRO-CHEMICAL DEVICE COMPRISING SAME

(71) Applicant: TOP Battery Co., Ltd, Gyeonggi-do (KR)

(72) Inventors: Whan Jin Roh, Seoul (KR); Woojin Jeon, Gyeonggi-do (KR); Byungsu Jung, Gyeonggi-do (KR); Kyungjoo Park, Gyeonggi-do (KR); Yunju Lee, Gyeonggi-do (KR)

(73) Assignee: Top Battery Co., Ltd, Gyeonggi-do (KR)

( * ) Notice: Subject to any disclaimer, the term of this patent is extended or adjusted under 35 U.S.C. 154(b) by 0 days.

(21) Appl. No.: 15/240,159

(22) Filed: Aug. 18, 2016

(65) Prior Publication Data

US 2017/0054130 A1 Feb. 23, 2017

(30) Foreign Application Priority Data

Aug. 21, 2015 (KR) ........................ 10-2015-0117952

(51) Int. Cl.
*H01M 2/30* (2006.01)
*H01M 2/20* (2006.01)
*H01G 9/042* (2006.01)
*H01G 9/048* (2006.01)
*H01G 9/035* (2006.01)
*H01G 9/26* (2006.01)
(Continued)

(52) U.S. Cl.
CPC .............. *H01M 2/30* (2013.01); *H01G 9/035* (2013.01); *H01G 9/042* (2013.01); *H01G 9/048* (2013.01); *H01G 9/26* (2013.01); *H01M 2/204* (2013.01); *H01M 2/0217* (2013.01); *H01M 10/052* (2013.01)

(58) Field of Classification Search
None
See application file for complete search history.

(56) References Cited

U.S. PATENT DOCUMENTS

| 5,773,164 A | 6/1998 | Venkatesan et al. |
| 2004/0157121 A1* | 8/2004 | Watanabe ........... H01M 2/0426 429/185 |
| 2010/0282613 A1* | 11/2010 | Schuh .................... B23H 9/008 205/170 |

FOREIGN PATENT DOCUMENTS

| CN | 101532153 A | 9/2009 |
| CN | 103125035 A | 5/2013 |

(Continued)

OTHER PUBLICATIONS

Machine Translation of Chinese Patent Publication No. CN101532153 (Year: 2009).*

*Primary Examiner* — Wyatt P McConnell
(74) *Attorney, Agent, or Firm* — Alston & Bird LLP

(57) ABSTRACT

Electrode terminals are provided. The electrode terminal includes a copper substrate and a metal layer covering at least one surface of the copper substrate, wherein the metal layer includes greater than or equal to about 10 wt % and less than or equal to about 80 wt % of tungsten (W), and an additional metal comprising nickel (Ni), silver (Ag), gold (Au), platinum (Pt), zinc (Zn), iron (Fe), lead (Pb), tin (Sn), molybdenum (Mo), beryllium (Be), rhodium (Rh), iridium (Ir), or a combination thereof. An electro-chemical device and an electro-chemical device module including the same are also provided.

13 Claims, 6 Drawing Sheets

(51) Int. Cl.
*H01M 2/02* (2006.01)
*H01M 10/052* (2010.01)

(56) References Cited

FOREIGN PATENT DOCUMENTS

| | | | |
|---|---|---|---|
| KR | 10-0593859 | B1 | 12/2005 |
| KR | 10-2007-0047378 | A | 5/2007 |
| KR | 10-2007-0116825 | A | 12/2007 |
| KR | 10-2009-0056050 | A | 6/2009 |
| KR | 10-2010-0008591 | A | 1/2010 |
| KR | 10-2011-0137891 | A | 6/2010 |
| KR | 10-2010-0137496 | A | 12/2010 |
| KR | 10-2011-0122055 | A | 11/2011 |
| KR | 10-1119832 | B1 | 12/2011 |
| KR | 20110137891 | * | 12/2011 |
| KR | 10-2015-0070701 | A | 6/2015 |
| KR | 10-2015-0084661 | A | 7/2015 |

* cited by examiner

ELECTRODE TERMINAL, ELECTRO-CHEMICAL DEVICE AND ELECTRO-CHEMICAL DEVICE COMPRISING SAME

CROSS-REFERENCE TO RELATED APPLICATION

This application claims the benefit of priority of Korean Patent Application No. 10-2015-0117952 filed on Aug. 21, 2015, the entire content of which is incorporated herein by reference in its entirety for all purposes.

TECHNICAL FIELD

The presently-disclosed invention relates to an electrode terminal, and an electro-chemical device and an electro-chemical device module including the same, and more specifically to an electrode terminal connected with an electrode of an electro-chemical device or an electrode terminal electrically connecting electro-chemical devices in an electro-chemical device module.

BACKGROUND

An electro-chemical device such as a primary battery, a rechargeable battery, a solar cell, a capacitor, and the like generates electrical energy through an electro-chemical reaction, and is called an energy storage device and is used as a portable power source.

The electro-chemical device in general consists of electrodes (positive and negative electrodes), an electrolyte solution, a separator, an exterior material, and an electrode terminal. The electrode terminal is welded to the exterior material of a battery or protruded out of the exterior material and electrically connected with the electrodes, and thus delivers electrons inside and outside of the battery. On the other hand, the electrode terminal is used to electrically connect more than one battery.

As for the electrode terminal, nickel (Ni) generally has excellent welding workability and corrosion resistance but is expensive and has relatively lower electrical conductivity than other materials and thus is not appropriate for a battery requiring high power, and copper (Cu) has excellent electrical conductivity but weak corrosion characteristics. Accordingly, copper (Cu) plated with nickel (Ni) or a nickel (Ni) alloy on the surface of the copper (CU) is known to be used for the electrode terminal.

However, an electrode terminal having higher electrical conductivity and simultaneously excellent corrosion resistance to obtain a high power battery is still required.

BRIEF SUMMARY

An example embodiment provides an electrode terminal including a tungsten (W)-containing metal layer plated on a surface of a copper (Cu) substrate and having improved electrical conductivity and corrosion resistance, and an electro-chemical device and an electro-chemical device module including the electrode terminal.

An example embodiment provides an electrode terminal including a copper substrate and a metal layer covering at least one surface of the copper substrate, wherein the metal layer includes greater than or equal to about 10 wt % and less than or equal to about 80 wt % of tungsten (W), and an additional metal selected from nickel (Ni), silver (Ag), gold (Au), platinum (Pt), zinc (Zn), iron (Fe), lead (Pb), tin (Sn), molybdenum (Mo), beryllium (Be), rhodium (Rh), iridium (Ir), and a combination thereof.

The additional metal may be nickel (Ni).

The additional metal may be a combination of nickel and silver (Ag).

The metal layer may include tungsten (W) and nickel (Ni) in a weight ratio of about 10:90 to about 70:30.

The metal layer may include tungsten and nickel in a weight ratio of about 20:80 to about 70:30.

The metal layer may include tungsten, nickel, and silver (Ag) in a weight ratio of about 10 to 70:29 to 89:1 to 20.

A thickness of the metal layer may be about 0.2 μm to about 5 μm.

The metal layer may be a plated layer provided by electroplating or electroless plating.

The metal layer may cover the entire surface of the copper substrate.

According to another embodiment, an electro-chemical device includes the electrode terminal.

The electro-chemical device may be a rechargeable lithium battery or a capacitor.

According to another embodiment, an electro-chemical device module includes a plurality of electro-chemical devices and a plurality of electrode terminals electrically connecting the electro-chemical devices, wherein the electrode terminal includes a copper substrate and a metal layer covering at least one surface of the copper substrate, and the metal layer includes greater than or equal to about 10 wt % and less than or equal to about 80 wt % of tungsten (W), and an additional metal selected from nickel (Ni), silver (Ag), gold (Au), platinum (Pt), zinc (Zn), iron (Fe), lead (Pb), tin (Sn), molybdenum (Mo), beryllium (Be), rhodium (Rh), iridium (Ir), and a combination thereof.

The plurality of electro-chemical devices may be disposed in a matrix form.

Electro-chemical devices neighboring in a first direction may be coupled in series or in parallel by the electrode terminal.

In addition, electro-chemical devices neighboring in a second direction may be coupled in series or in parallel by the electrode terminal.

Other embodiments are included in the following detailed description.

An electro-chemical device having high power, high efficiency, and high durability, and an electro-chemical device module, may be realized through an electrode terminal having excellent electrical conductivity and simultaneously improved corrosion resistance.

BRIEF DESCRIPTION OF THE SEVERAL VIEWS OF THE DRAWING(S)

DETAILED DESCRIPTION

Figure 1:
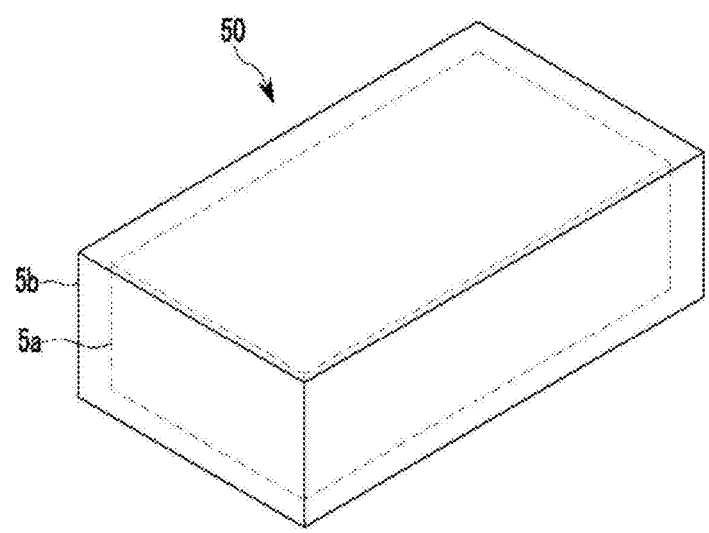
FIG. 1 is a perspective view showing an electrode terminal according to an exemplary embodiment.

Exemplary embodiments will hereinafter be described in detail, and may be easily performed by those who have common knowledge in the related art. However, this disclosure may be embodied in many different forms and is not construed as limited to the exemplary embodiments set forth herein. The same reference numerals designate the same constituent elements throughout the specification.

An embodiment provides an electrode terminal including a copper substrate and a metal layer covering at least one surface of the copper substrate, wherein the metal layer includes tungsten (W).

The electrode terminal according to the embodiment may be used for various electro-chemical devices such as a primary battery, a rechargeable battery, a solar cell, a capacitor, and the like, and is electrically connected with electrodes and protruded out of an electro-chemical device and thus electrically connects inside and outside of the electro-chemical device or different electro-chemical devices, but is not necessarily limited to the these uses.

Hereinafter, the electrode terminal according to an embodiment is schematically illustrated referring to FIG. 1.

FIG. 1 is a perspective view showing the electrode terminal according to an exemplary embodiment.

Referring to FIG. 1, an electrode terminal 50 includes a copper substrate 5a and a tungsten (W)-containing metal layer 5b on a surface of the copper substrate 5a, and has overall electrical conductivity.

The electrode terminal may have an oval or circular shape, or at least a bending cross-sectional shape, without being limited to the shape shown in FIG. 1. An electrochemical device manufactured by applying the electrode terminal 50 will be described later.

The copper substrate 5a is a foil-shaped thin film and forms a core of the electrode terminal 50. The copper substrate 5a may be, for example, about 0.01 to about 2 mm thick, or for example, about 0.05 mm to about 1 mm thick. When the copper substrate 5a is less than about 0.01 mm thick, the copper substrate is so thin that the electrode terminal 50 may be weak with respect to a physical environment and have low electrical conductivity, but when the copper substrate 5a is greater than about 2 mm thick, the copper substrate 5a may have an increased manufacturing cost of the electrode terminal 50 because of an increased area for forming a metal layer 5b, and may have a disadvantage with respect to weight and size reduction of an electro-chemical device due to an increased weight and thickness. However, the thickness of the copper substrate may not be limited within the above range, and may be appropriately selected by a person of ordinary skill in the related art depending on a size or capacity of an electro-chemical device manufactured by applying an electrode terminal.

The copper substrate 5a may be, for example, about 1 to about 150 mm wide, or for example, about 1 mm to about 15 mm wide. The width of the copper substrate 5a may not be limited within the above range, and may be appropriately selected by a person of ordinary skill in the related art depending on an electro-chemical device manufactured by applying an electrode terminal.

The copper substrate 5a may have purity of, for example, greater than or equal to about 99.0%, or for example, greater than or equal to about 99.5%. When the copper substrate 5a has purity of greater than or equal to about 99.0%, the copper substrate 5a has high resistivity and thus shows high conductivity usable for an electro-chemical device.

The metal layer 5b covers at least one surface of the copper substrate 5a. The metal layer 5b includes tungsten having higher electrical conductivity and stronger corrosion resistance than the copper substrate 5a, and as shown in FIG. 1, may be formed to cover the whole surface of the copper substrate 5a. Accordingly, the electrode terminal 50 may be suppressed from corroding by an electrolyte solution including a strong acid and the like and maintains high electrical conductivity.

The tungsten (W) has excellent electrical conductivity and corrosion resistance but has a very high melting point of about 3407° C. and thus generally has insufficient welding workability, and also has a low standard reduction potential of about −0.58 V and thus is difficult to plate.

However, the present Inventors form the metal layer 5b through a welding process such as laser welding, ultrasonic welding, resistance welding, and the like, and in addition, through a plating process such as electroplating or electroless plating on a substrate, such that the electrode terminal 50 has excellent electrical conductivity and corrosion resistance by alloying tungsten with an additional metal selected from nickel (Ni), silver (Ag), gold (Au), platinum (Pt), zinc (Zn), iron (Fe), lead (Pb), tin (Sn), molybdenum (Mo), beryllium (Be), rhodium (Rh), iridium (Ir), and a combination thereof.

Accordingly, in an embodiment, the metal layer 5b may include at least a binary alloy of tungsten (W) with at least one heterogeneous metal, and may be plated on the surface of the copper substrate 5a in an electroplating or electroless plating method.

In an exemplary embodiment, a thickness of the metal layer 5b may be, for example, about 0.2 µm to about 5 µm, or for example, about 0.5 µm to about 2 µm. When the metal layer 5b is less than about 0.2 µm thick, the surface of the copper substrate 5a may not be entirely covered by the metal layer 5b but may be partly exposed to the outside, and thus may be weak against a chemical environment such as corrosion by an electrolyte solution such as hydrofluoric acid (HF) and the like. When the metal layer 5b is greater than about 5 µm thick, its electrical conductivity may be significantly deteriorated compared with the copper substrate 5a, and its productivity may also be deteriorated, because it takes a long time to form the metal layer 5b.

In an exemplary embodiment, a content of the tungsten (W) in the metal layer 5b may be less than or equal to about 80 wt %, for example less than or equal to about 78 wt %, less than or equal to about 76 wt %, less than or equal to about 74 wt %, or less than or equal to about 72 wt %.

On the other hand, the metal layer 5b may include tungsten (W) in an amount of greater than or equal to about 10 wt %, for example, greater than or equal to about 12 wt %, greater than or equal to about 14 wt %, greater than or equal to about 16 wt %, greater than or equal to about 18 wt %, or greater than or equal to about 20 wt %.

When the tungsten (W) is included within the range, the metal layer 5b may have excellent corrosion resistance against a strong acid and a strong base and may maintain high electrical conductivity, and may also have excellent welding workability and plating property through being alloyed with a heterogeneous metal used in the remaining amount.

In an exemplary embodiment, the metal layer 5b may be formed of a tungsten (W)-nickel (Ni) binary alloy by further including nickel (Ni) as a heterogeneous metal.

In the tungsten (W)-nickel (Ni) binary alloy, a weight ratio of tungsten (W):nickel (Ni) in the metal layer 5b may be about 10:90 to about 70:30, for example about 20:80 to about 70:30.

As aforementioned, when the tungsten (W) is included in a weight ratio of greater than about 70%, workability of a tungsten (W)-nickel (Ni) binary alloy may be deteriorated, and when the tungsten (W) is included in a weight ratio of less than 10%, the tungsten (W) is included at so small a content that the tungsten (W)-nickel (Ni) binary alloy may be weak against oxidization by aqueous vapor in the air or an electrolyte solution including a strong acid such as hydrofluoric acid (HF) and the like, and may also have insufficient electrical conductivity and thus may deteriorate battery performance.

On the other hand, the metal layer 5b may be formed of a tungsten (W)-nickel (Ni)-silver (Ag) ternary alloy by further including a combination of nickel (Ni) and silver (Ag) as a heterogeneous metal.

In the tungsten (W)-nickel (Ni)-silver (Ag) ternary alloy, a weight ratio of tungsten (W):nickel (Ni):silver (Ag) in the metal layer 5b may be about 10 to 70:29 to 89:1 to 20.

In this way, when the tungsten (W) is included in a weight ratio of greater than or equal to about 70%, workability of the tungsten (W)-nickel (Ni)-silver (Ag) ternary alloy may be deteriorated, and when the tungsten (W) is included in a weight ratio of less than about 10%, the tungsten (W)-nickel (Ni)-silver (Ag) ternary alloy includes the tungsten (W) in too small a content and thus may be weak against oxidization by aqueous vapor in the air or an electrolyte solution including a strong acid such as hydrofluoric acid (HF) and the like.

When the nickel (Ni) is included in a weight ratio of greater than about 89%, the tungsten (W)-nickel (Ni)-silver (Ag) ternary alloy may have weak corrosion resistance against an electrolyte solution including a strong acid such as hydrofluoric acid (HF) and the like and insufficient electrical conductivity and thus deteriorate battery performance, and when the nickel (Ni) is included in a weight ratio of less than about 29%, the tungsten (W)-nickel (Ni)-silver (Ag) ternary alloy may have deteriorated workability and oxidation resistance.

When the silver (Ag) is included in a weight ratio of greater than about 20%, a cost may be substantially increased, and when the silver (Ag) is included in a weight ratio of less than about 1%, the silver (Ag) may have little effect on improving electrical conductivity.

On the other hand, the electrode terminal 50 according to an embodiment may have a structure in which the metal layer 5b including tungsten is formed as a monolayer on the surface of the copper substrate 5a or on the surface of a nickel (Ni) layer after first forming the nickel (Ni) layer on the surface of the copper substrate 5a or a multilayered structure in which a plurality of nickel (Ni) layers and a plurality of metal layers 5b are alternatively disposed on the surface of the copper substrate 5a.

In this way, the electrode terminal 50 according to an embodiment exhibits excellent electrical conductivity but has an effect of physically and chemically protecting the copper substrate 5a having weak corrosion resistance. In addition, compared with a structure having a nickel (Ni) or nickel (Ni)-chromium (Cr) alloy layer on the surface of the copper substrate 5a according to a comparative example to be described later, the electrode terminal including the metal layer 5b exhibits excellent electrical conductivity and corrosion resistance.

In other words, the electrode terminal 50 according to an embodiment has excellent corrosion resistance against an electrolyte solution including a strong acid such as hydrofluoric acid (HF) and the like, which is not obtained by the conventional electrode terminal having a nickel (Ni) monolayer or a nickel (Ni)-chromium (Cr) alloy layer on the surface of the copper substrate, and thus may realize an electro-chemical device having high power, high efficiency, and high durability.

Hereinafter, referring to FIGS. 2 to 4, electro-chemical devices manufactured by respectively applying the electrode terminal according to an embodiment are illustrated.

Figure 2:
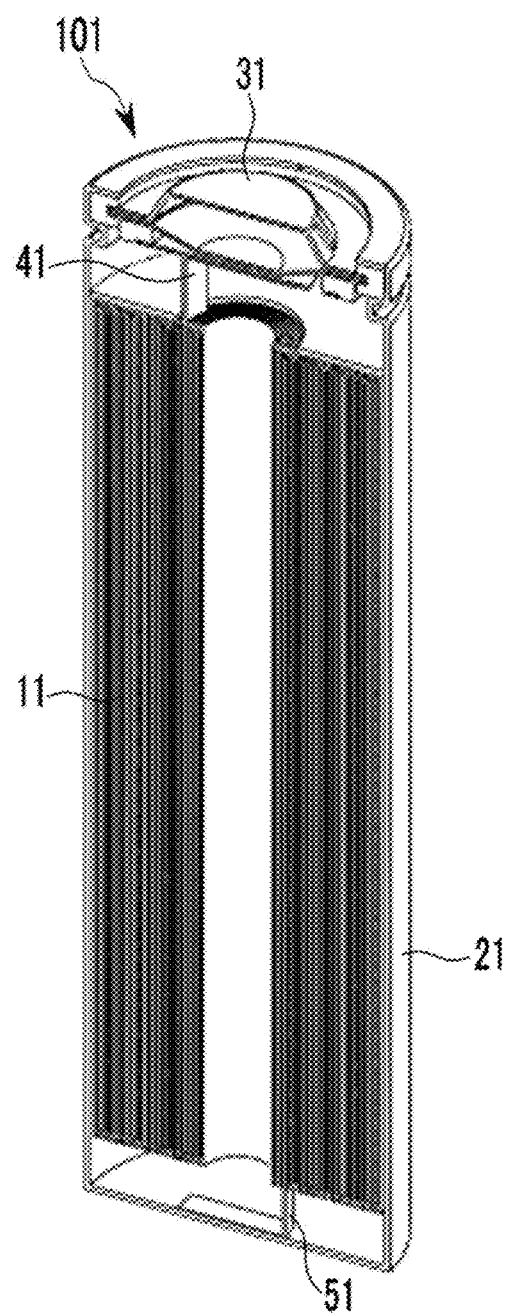
FIG. 2 is a schematic view showing a cylindrical battery including an electrode terminal according to an exemplary embodiment.
Figure 3:
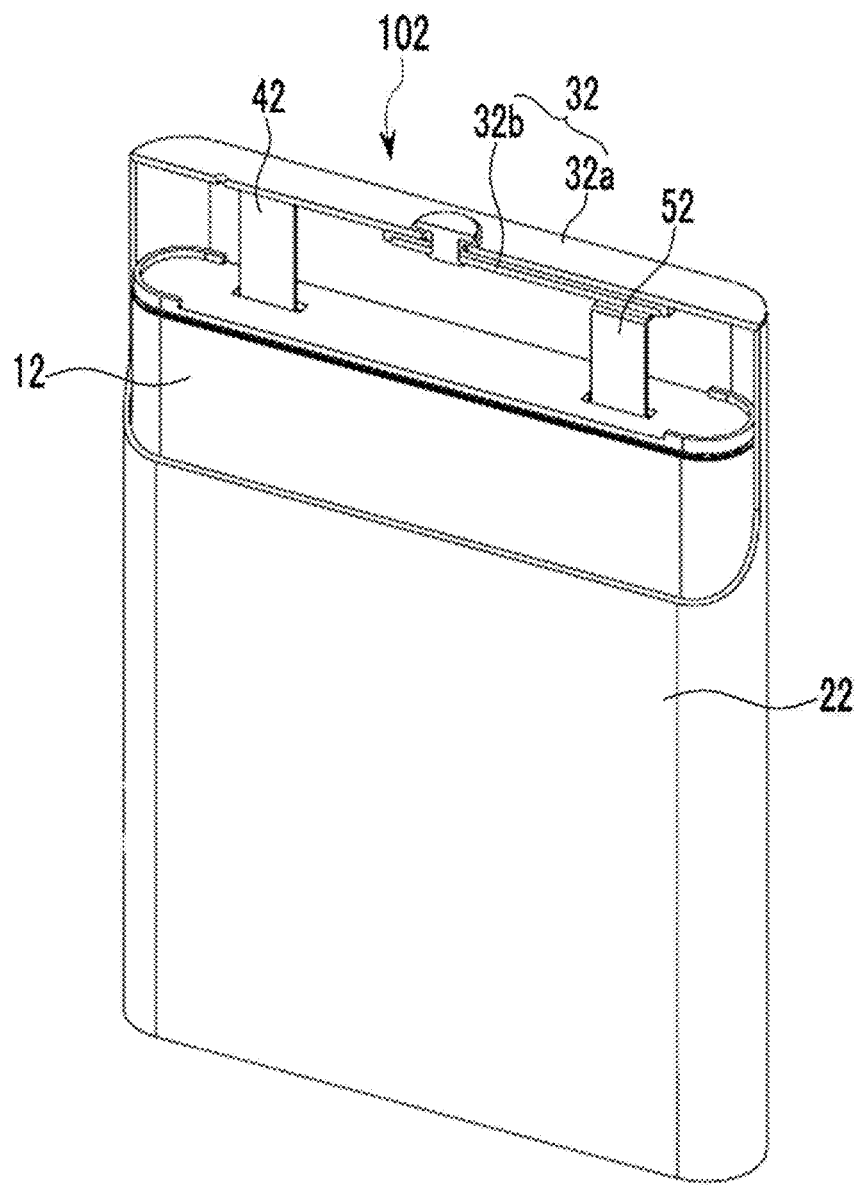
FIG. 3 is a schematic view showing a prismatic battery including an electrode terminal according to an exemplary embodiment.
Figure 4:
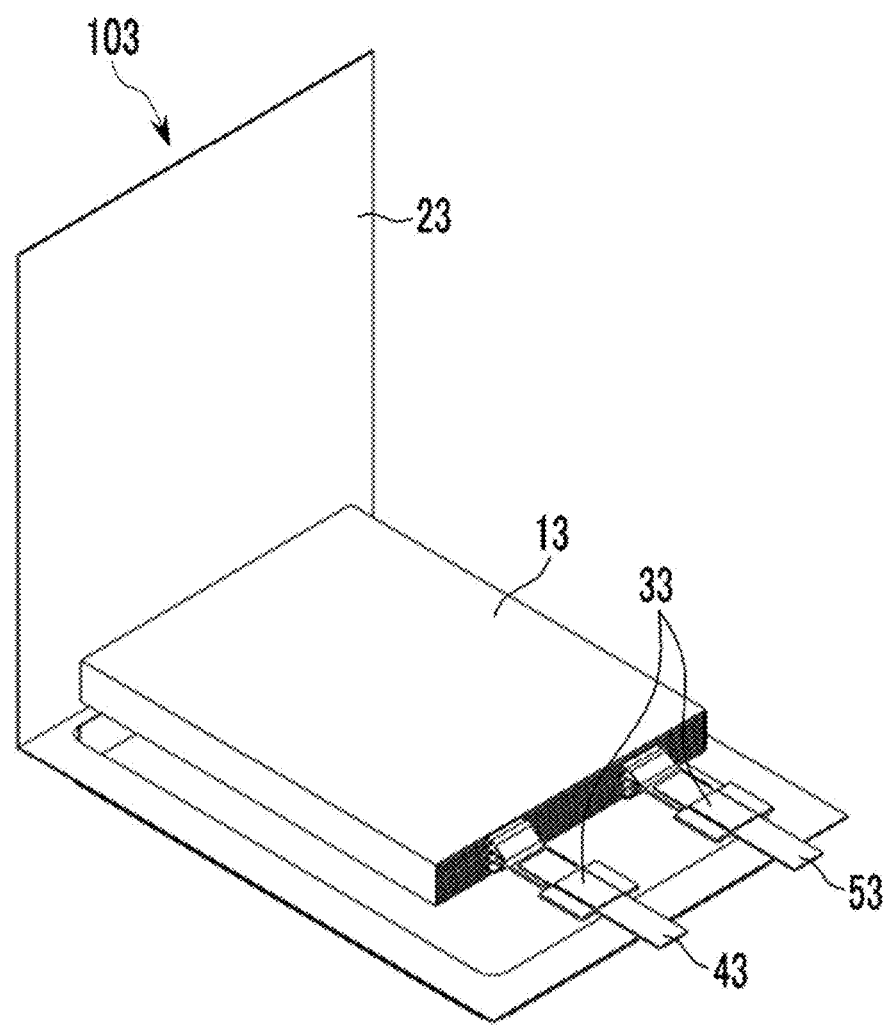
FIG. 4 is a schematic view showing a polymer battery including an electrode terminal according to an exemplary embodiment.

Referring to FIGS. 2 to 4, each electro-chemical device of the embodiment is illustrated by taking an example of a lithium ion battery having various shapes for convenience, but the electrode terminal is not limited thereto, and may be used to electrically connect various batteries, that is, a primary battery or a solar cell, and more than one electro-chemical device. This use of the electrode terminal is described later according to another embodiment.

FIG. 2 is a schematic view showing a cylindrical battery including an electrode terminal according to an exemplary embodiment, FIG. 3 is a schematic view of a prismatic battery including an electrode terminal according to an exemplary embodiment, and FIG. 4 is a schematic view of a polymer battery including an electrode terminal according to an exemplary embodiment.

Referring to FIGS. 2 to 4, the electrode terminal may be used as negative terminals 51, 52, and 53 in each of a cylindrical battery 101, a prismatic battery 102, and a polymer battery 103.

The electro-chemical devices 101, 102, and 103 of FIGS. 2 to 4 may generally have a different shape depending on each case shape, but basically consist of the same components such as electrode assemblies 11, 12, and 13 obtained by uniting positive and negative electrodes, and a separator sandwiched between the positive and negative electrodes, cases 21, 22, and 23, and positive terminals 41, 42, and 43 and negative terminals 51, 52, and 53 respectively electrically connected with the electrode assemblies 11, 12, and 13.

In the lithium ion battery, a positive electrode is manufactured by coating a positive active material, that is, a lithium metal oxide intercalating and deintercalating lithium ions, for example $LiCoO_2$ and like, with a conductive material and a binder in a slurry state on a current collector formed of aluminum (Al) and the like, and then drying it and compressing them, and a negative electrode is manufactured by coating a negative active material reversibly intercalating/deintercalating lithium ions, for example, a carbon-based material such as graphite, carbon nanoparticles, hard carbon, soft carbon, mesophase pitch carbonized product, fired coke, and the like, silicon (Si), tin (Sn), and the like, with a binder in a slurry state on a current collector formed of copper and the like, and then drying it and compressing them.

The conductive material improves conductivity of an electrode, and any electrically conductive material may be used as a conductive material unless it causes a chemical change. Examples may be natural graphite, artificial graphite, carbon black, acetylene black, ketjen black, a carbon fiber, a metal powder or a metal fiber of copper, nickel, aluminum, silver, and the like, or a conductive material such as a polyphenylene derivative and the like.

The binder improves binding properties of positive active material particles with one another and with a current collector, and examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The separator may include any materials commonly used in the conventional lithium battery as long as it separates the negative electrode from the positive electrode and provides a transporting passage of lithium ions. In other words, it may have low resistance to ion transport and excellent impregnation for an electrolyte solution. For example, it may be selected from glass fiber, polyester, polyethylene, polypropylene, polytetrafluoroethylene (PTFE), or a combination thereof. It may have a form of a non-woven fabric or a woven fabric. For example, in a lithium ion battery, a polyolefin-based polymer separator such as polyethylene and polypropylene is mainly used. In order to ensure the heat resistance or mechanical strength, a coated separator including a ceramic component or a polymer material may be used. Optionally, it may have a mono-layered or multi-layered structure.

Herein, in the negative and positive electrodes, a part of the current collectors is not coated with the positive and negative active materials but is left and then respectively connected with the positive and negative terminals, so that the positive and negative terminals may be respectively connected with each electrode.

On the other hand, the cylindrical battery 101 is manufactured by winding the electrode assembly 11 into a jelly-roll shape, housing the jelly-roll shaped electrode assembly 11 in the cylindrical case 21, and connecting a cap assembly 31 on top of the case 21.

One end of the positive terminal 41 with a part of the current collector not coated with a positive active material in the positive electrode and one end of the negative terminal 51 with a part of the current collector not coated with a negative active material in the negative electrode are respectively welded through resistance welding, ultrasonic welding, laser welding, or the like.

In addition, the other end of the positive terminal 41 with the positive current collector and the cap assembly 31 and the other end of the negative terminal 51 with the negative current collector and the bottom surface of the cylindrical battery 101 are respectively welded through resistance welding, ultrasonic welding, laser welding, or the like. Accordingly, the positive terminal 41 is connected with the positive electrode and a cap on the case, and the negative terminal 51 may be connected with the negative electrode and the bottom surface of the battery.

The prismatic battery 102 is manufactured by winding the electrode assembly 12 into a jelly-roll shape, housing the jelly-roll shaped electrode assembly in to the prismatic case 22, and connecting a cap assembly 32 on the case 22.

One end of the positive terminal 42 with a part of the current collector not coated with a positive active material in the positive electrode and one end of the negative terminal 52 with a part of the current collector not coated with a negative active material in the negative electrode are respectively welded through resistance welding, ultrasonic welding, laser welding, or the like.

In addition, the other end of the positive terminal 42 with the positive current collector and the cap assembly 32 and the other end of the negative terminal 52 with the negative current collector and the cap assembly 32 are respectively welded through resistance welding, ultrasonic welding, laser welding, or the like. The cap assembly 32 includes a first region 32a and a second region 32b, and as shown in FIG. 3, the positive terminal 42 may be electrically connected to the first region 32a while the negative terminal 52 may be connected to the second region 32b.

The polymer battery 103 is manufactured by housing the electrode assembly 13 sandwiched in the pouch-shaped case 23 and respectively welding the positive terminal 43 with a part of the current collector not coated with the positive active material in the positive electrode and the negative terminal 53 with a part of the current collector not coated with the negative active material in the negative electrode through resistance welding, ultrasonic welding, laser welding, or the like. In addition, the positive terminal 43 and the negative terminal 53 may be fixed into the case 23 by respectively attaching an insulating sealant 33 formed of polypropylene and the like on both of the surfaces of each positive and negative terminal 43 and 53 facing each other and adhering the insulating sealant 33 to the case 23.

Then, the case 23 is bonded and sealed to isolate the electrode assembly 13 from the outside. Herein, the positive terminal 43 and the negative terminal 53 are respectively protruded out of the pouch-shaped case 23 and electrically connected with the outside.

In this way, an electrode terminal according to the embodiment may be used as the negative terminals 51, 52, and 53 for each of the cylindrical rechargeable battery 101, the prismatic rechargeable battery 102, the and polymer battery 103, respectively.

According to an embodiment, the electrode terminal includes a metal layer including an alloy of tungsten and a heterogeneous metal, and thus may have improved welding workability and may be easily welded into the bottom surface of the cylindrical case 101, the cap assembly 32, negative electrodes in the electrode assemblies 11, 21, and 31, and the like.

In addition, the electrode terminal according to an embodiment has high electrical conductivity and excellent oxidation and corrosion resistance, and thus is not corroded when exposed to an electrolyte solution including a strong acid such as hydrofluoric acid (HF) and the like as well as aqueous vapor in the air, and resultantly may realize an electro-chemical device having high power, high efficiency, and high durability.

Hereinafter, referring to FIG. 5, an electro-chemical device module according to another embodiment is illustrated.

Figure 5:
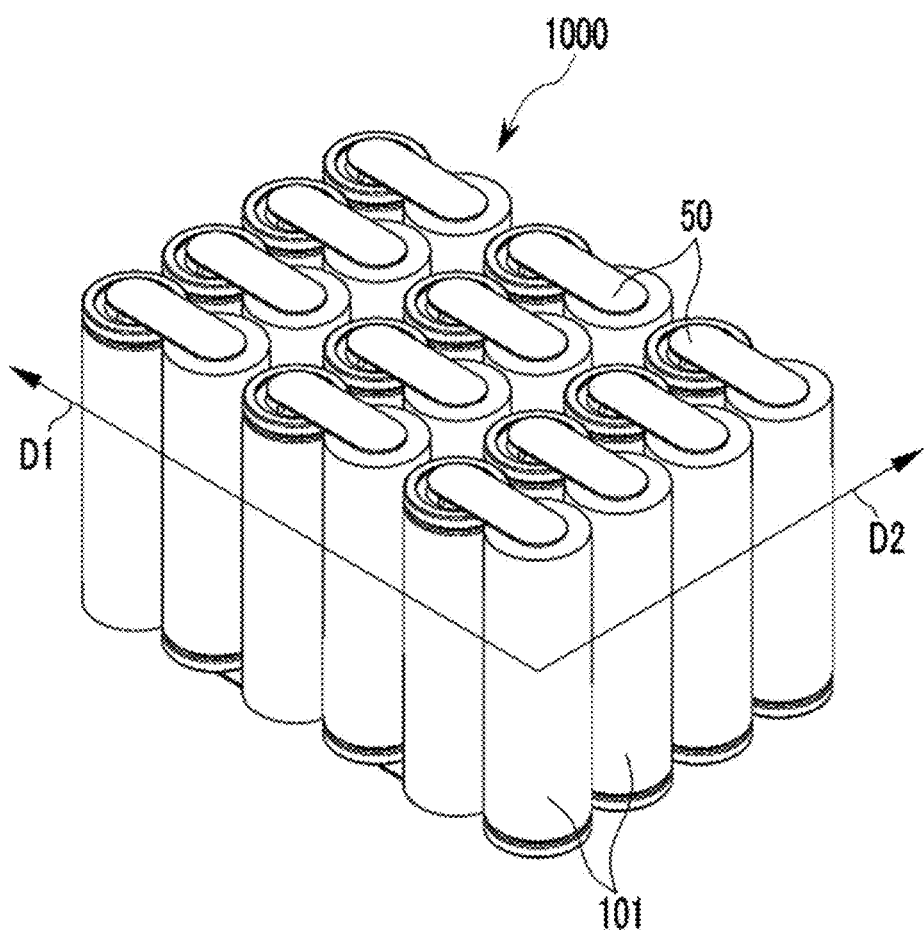
FIG. 5 is a perspective view showing an electro-chemical device module in which a plurality of cylindrical batteries according to an embodiment are disposed in a matrix form.

FIG. 5 is a schematic perspective view showing the electro-chemical device module in which a plurality of electro-chemical devices are electrically connected according to another embodiment.

The electro-chemical device module 1000 includes a plurality of electro-chemical devices 101 and a plurality of electrode terminals 50 electrically connecting them. The electrode terminals 50 may include a copper substrate and a tungsten-based alloy layer plated on the copper substrate, as shown in the above embodiment.

On the other hand, in FIG. 5, each electro-chemical device 101 is shown as the aforementioned cylindrical battery 101 of FIG. 2, but is not limited thereto, and may be a prismatic battery or a polymer battery without any particular limit in terms of shape.

A plurality of electro-chemical devices 101 may be disposed in a matrix form respectively in a first direction (D1) and a second direction (D2) perpendicular with the first direction (D1).

The plurality of electro-chemical devices 101 may be disposed to be electrically connected with neighboring electro-chemical devices 101 having opposite polarity through the electrode terminals 50 in the first direction (D1).

In other words, the electrode terminals 50 connect the top and bottom surfaces of alternatively neighboring negative and positive electrodes of the electro-chemical devices 101, so that the plurality of electro-chemical devices 101 of the electro-chemical device module 1000 may be entirely coupled in series in the first direction.

On the other hand, the plurality of electro-chemical devices coupled in series in the first direction (D1) may be disposed in parallel in the second direction (D2).

In this way, the electrode terminals 50 are disposed to couple the electro-chemical devices 101 in series in the first direction (D1) in the electro-chemical device module 1000 in which positive and negative electrodes of the neighboring electro-chemical devices 101 are alternatively disposed in the first direction (D1), and the electrode terminals 50 apart from the electro-chemical devices 101 disposed in the second direction (D2) may be coupled in parallel. In other words, the electro-chemical device module 1000 may have electrical connection in series in the first direction (D1) but in parallel in the second direction (D2).

However, the electrode terminals 50 may not necessarily be disposed in this way, but may be variously disposed depending on disposition of the electro-chemical devices 101. In other words, the electro-chemical devices 101 may be, for example, disposed to have the same polarity in the first direction (D1) but opposite polarity in the second direction (D2), and the electrode terminals 50 may electrically connect electrodes having the same polarity among the electro-chemical devices 101.

In this way, as shown in FIG. 5, another embodiment may provide the electro-chemical device module 1000 having a structure in which the neighboring electro-chemical devices 101 are connected in series through the electrode terminal 50 in the first direction (D1), while the neighboring electro-chemical devices 101 in the second direction (D2) are disposed in parallel.

In addition, the electrode terminals 50 electrically connecting each electro-chemical device 101 includes a tungsten-based alloy and thus may have excellent electrical conductivity and corrosion resistance, and resultantly realize the electro-chemical device module 1000 having high power, high efficiency, and high durability.

EXAMPLES

Hereinafter, the embodiments are illustrated in more detail with reference to examples. The examples relate to manufacture and evaluation of the polymer battery 103 including the electrode terminals 50. These examples, however, are not in any sense to be interpreted as limiting the scope of the invention. Furthermore, what is not described in this disclosure may be sufficiently understood by those who have knowledge in this field and will not be illustrated here.

Manufacture of Electrode Terminal

Example 1

A 0.1 mm thick and 4 mm wide copper foil having purity of 99.96% according to a Japanese Industrial Standards (JIS) No. C1100 and manufactured in a compression method was dipped in a degreasing solution. The copper foil dipped in the degreasing solution was connected to a negative electrode, and a stainless steel electrode of JIS No. SUS 304 was used as a positive electrode for electrolytic degreasing at 25±5° C. under a current density of 1 A/dm² for 2 min. The electrolytically-degreased copper foil was cleaned with distilled water and impregnated in a common etching solution for 60 s to etch its surface. The surface-etched copper foil was cleaned with distilled water to obtain a copper substrate.

On the other hand, a tungsten (W)-nickel (Ni) alloy-plating solution was prepared by dissolving sodium tungstate dihydrate ($Na_2WO_4.2H_2O$, Sigma-Aldrich Co.) and nickel sulfate hexahydrate ($NiSO_4.6H_2O$, Sigma-Aldrich Co.) in water until an ion content ratio (tungsten ion:nickel ion) between tungsten (W) and nickel (Ni) became 70:30 wt %.

The copper substrate was impregnated in a plating bath containing 500 mL of the tungsten (W)-nickel (Ni) alloy plating solution and connected to the negative electrode, with the stainless steel electrode having a JIS: SUS 304 standard as a positive electrode, and then plated at 60±5° C. under current density of 0.8 A/dm² for 10 min to manufacture an electrode terminal including a metal layer formed of a tungsten (W)-nickel (Ni) binary alloy.

Example 2

An electrode terminal was manufactured according to the same method as Example 1, except for using a tungsten (W)-nickel (Ni) alloy plating solution having an ion content ratio (tungsten (W):nickel (Ni)) of 50:50 wt %.

Example 3

An electrode terminal was manufactured according to the same method as Example 1, except for using a tungsten (W)-nickel (Ni) alloy plating solution having an ion content ratio (tungsten (W):nickel (Ni)) of 30:70 wt %.

Example 4

An electrode terminal was manufactured according to the same method as Example 1, except for using a tungsten (W)-nickel (Ni)-silver (Ag) alloy plating solution prepared by dissolving sodium tungstate dihydrate ($Na_2WO_4.2H_2O$, Sigma-Aldrich Co.), nickel sulfate hexahydrate ($NiSO_4.6H_2O$, Sigma-Aldrich Co.), and silver nitrate ($AgNO_3$, Sigma-Aldrich Co.) in water to have a content ratio among tungsten ions:nickel ions:silver ions of 50:40:10 wt %.

Comparative Example 1

An electrode terminal was manufactured according to the same method as Example 1, except for using a nickel (Ni) plating solution prepared by using nickel sulfate hexahydrate ($NiSO_4.6H_2O$, Sigma-Aldrich Co.).

Comparative Example 2

An electrode terminal was manufactured according to the same method as Example 1, except for using a nickel (Ni)-chromium (Cr) alloy plating solution prepared by mixing nickel sulfate hexahydrate ($NiSO_4.6H_2O$, Sigma-Aldrich Co.) and potassium dichromate ($K_2Cr_2O_7$, Sigma- Aldrich Co.) to have an ion content ratio (nickel (Ni):chromium (Cr)) of 70:30 wt %.

Comparative Example 3

An electrode terminal was manufactured according to the same method as Example 1, except for using a nickel (Ni)-zinc (Zn) alloy plating solution prepared by mixing nickel sulfate hexahydrate ($NiSO_4 \cdot 6H_2O$, Sigma-Aldrich Co.) and a zinc-including precursor to have an ion content ratio (nickel (Ni):zinc (Zn)) of 70:30 wt %.

Comparative Example 4

An electrode terminal was manufactured according to the same method as Comparative Example 3, except for using a nickel (Ni)-zinc (Zn) alloy plating solution to have an ion content ratio (nickel (Ni):zinc (Zn)) of 30:70 wt %.

Comparative Example 5

An electrode terminal was manufactured according to the same method as Example 1, except for using a tungsten (W)-nickel (Ni) alloy plating solution to have an ion content ratio (tungsten (W):nickel (Ni)) of 90:10 wt %.

Comparative Example 6

An electrode terminal was manufactured according to the same method as Example 1, except for using a tungsten (W)-nickel (Ni) alloy plating solution to have an ion content ratio (tungsten (W):nickel (Ni)) of 10:90 wt %.

Evaluation 1: Thickness of Metal Layer

Thickness of a metal layer plated in each electrode terminal according to Examples 1 to 4 and Comparative Examples 1 to 6 was measured by using XRF (X-ray fluorescence) spectroscopy, and the results are shown in Table 1.

Evaluation 2: Elemental Analysis of Metal Layer Surface

Each elemental analysis was performed regarding the surface of the metal layer of each electrode terminal according to Examples 1 to 4 and Comparative Examples 1 to 6 by using energy dispersive X-ray spectroscopy (EDS), and the results are shown in Table 1.

Figure 6:
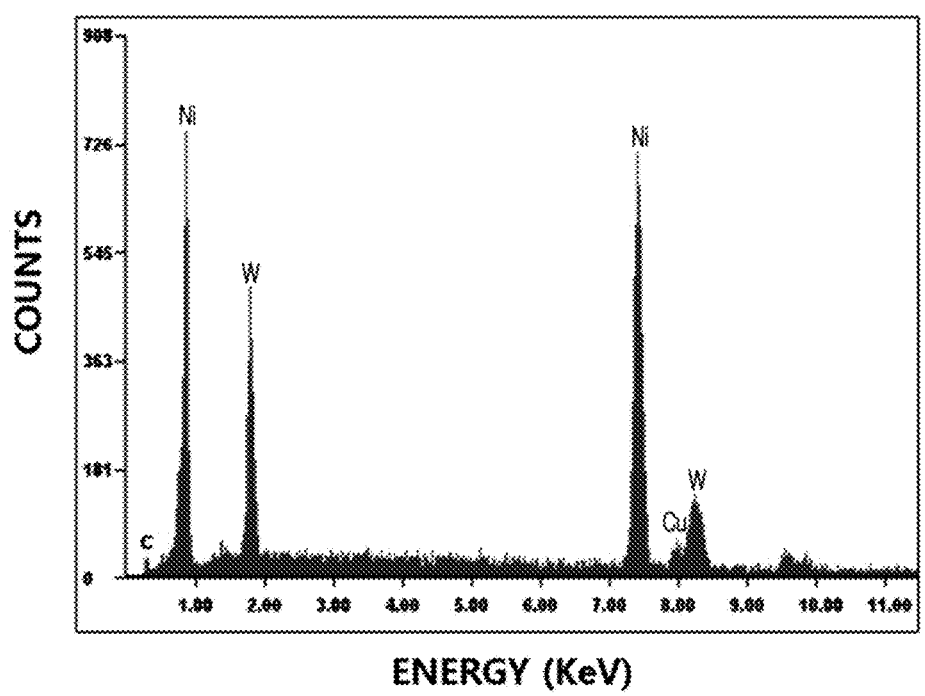
FIG. 6 is a graph showing an EDS (energy dispersive x-ray spectroscopy) element analysis result regarding the surface of a metal layer formed in the electrode terminal according to Example 3.

FIG. 6 is a graph showing an EDS (energy dispersive x-ray spectroscopy) element analysis result of the surface of the metal layer according to Example 3. Referring to FIG. 6, the metal layer of the electrode terminal according to Example 3 included nickel and tungsten as a main component on the surface. In FIG. 6, carbon (C) was caused from an impurity. In addition, FIG. 6 shows a small copper (Cu) peak, which was caused from the copper substrate of the electrode terminal.

Evaluation 3: Electrical Conductivity of Electrode Terminal

Electrical conductivity of each electrode terminal according to Examples 1 to 4 and Comparative Examples 1 to 6 was measured by using a four point probe method, and the results are shown in Table 1.

Evaluation 4: Corrosion Resistance of Metal Layer

Corrosion resistance of each electrode terminal according to Examples 1 to 4 and Comparative Examples 1 to 6 was evaluated. Specifically, each electrode terminal was impregnated in an electrolyte solution including 5,000 ppm of $H_2O$ (including 1.0 M $LiPF_6$ and a mixed solution of ethylene carbonate (EC):diethyl carbonate (DEC):methylethyl carbonate (MEC) in a volume ratio of 1:1:1) and allowed to stand for 24 h, and then an area that the metal layer was peeled off was measured, and the results are shown in Table 1.

Evaluation 5: Adherence to Insulating Sealant

A 0.1 mm-thick, 4 mm-wide, and 6 mm-long polypropylene insulating sealant (sealant film) was respectively disposed on both facing sides of each electrode terminal and thermally welded therewith, and then the electrode terminal was impregnated in the electrolyte solution including 5,000 ppm of $H_2O$ of Evaluation 4 (including 1.0 M $LiPF_6$ and a mixed solution of ethylene carbonate (EC):diethyl carbonate (DEC):methylethyl carbonate (MEC) in a volume ratio of 1:1:1) and allowed to stand for 24 h. Subsequently, the electrode terminal was taken out of the electrolyte solution and dried, the insulating sealant on one surface was peeled off and fixed on one side of a tensile strength meter (Model TO-100-IC, Test One), while the terminal was fixed on the other side, and then an adhesive force was measured while the insulating sealant was detached from the surface of the electrode terminal, and the results are shown in Table 1.

Evaluation 6: Ultrasonic Wave Welding Property with Copper Substrate

Each electrode terminal according to Examples 1 to 4 and Comparative Examples 1 to 6 was overlapped with 10 sheets of 10 μm-thick, 6 mm-wide, and 5 cm long copper foil and welded therewith with an ultrasonic wave welder (Branson, 20 kHz). A welding force was measured by fixing 10 sheets of copper foil on one side of a tensile strength meter (Model TO-100-IC, Test One) and the terminal on the other side and then eliminating the welded region, and the results are shown in Table 1.

TABLE 1

| | Ion content ratio of plating solution composition (wt %) | Thickness of metal layer (μm) | Component element content ratio of metal layer (wt %) | Electrical conductivity (S/m, ×10$^7$) | Area where metal layer was peeled off (%) | Adhesive force (kgf) | Ultrasonic wave welding strength (kgf) |
|---|---|---|---|---|---|---|---|
| Ex. 1 | tungsten:nickel 70:30 | 1.25 | tungsten:nickel 68:32 | 1.98 | 0 | 4.8 | 8.4 |
| Ex. 2 | tungsten:nickel 50:50 | 1.34 | tungsten:nickel 47:53 | 1.82 | 0 | 4.4 | 9.2 |
| Ex. 3 | tungsten:nickel 30:70 | 1.41 | tungsten:nickel 28:72 | 1.76 | 0 | 4.3 | 9.4 |
| Ex. 4 | tungsten:nickel:silver 50:40:10 | 1.44 | tungsten:nickel:silver 47:44:9 | 2.35 | 0 | 4.6 | 9.1 |
| Comp. Ex. 1 | nickel 100 | 1.51 | nickel 100 | 1.25 | 83 | 1.2 | 9.2 |
| Comp. Ex. 2 | nickel:chromium 70:30 | 1.36 | nickel:chromium 73:27 | 1.12 | 72 | 1.4 | 7.6 |

TABLE 1-continued

| | Ion content ratio of plating solution composition (wt %) | Thickness of metal layer (μm) | Component element content ratio of metal layer (wt %) | Electrical conductivity (S/m, ×10$^7$) | Area where metal layer was peeled off (%) | Adhesive force (kgf) | Ultrasonic wave welding strength (kgf) |
|---|---|---|---|---|---|---|---|
| Comp. Ex. 3 | nickel:zinc 70:30 | 1.23 | nickel:zinc 64:36 | 1.16 | 97 | 1.4 | 6.3 |
| Comp. Ex. 4 | nickel:zinc 30:70 | 1.34 | nickel:zinc 22:78 | 1.03 | 100 | 0.7 | 6.1 |
| Comp. Ex. 5 | tungsten:nickel 10:90 | 1.48 | tungsten:nickel 7:93 | 1.32 | 54 | 2.4 | 9.0 |
| Comp. Ex. 6 | tungsten:nickel 90:10 | 1.12 | tungsten:nickel 86:14 | 2.12 | 0 | 4.7 | 0.2 |

Referring to Table 1, Examples 1 to 3 respectively had an element content ratio between tungsten:nickel of 68:32, 47:53, and 28:72 in their plating layers by using each plating solution respectively adjusted to have an ion content ratio of 70:30, 50:50, and 30:70 as a binary alloy of tungsten (W) and nickel (Ni).

Example 4 showed a final element content ratio among tungsten (W):nickel (Ni):silver (Ag) of 47:44:9 by using a plating solution having an ion content ratio of 50:40:10 as a tungsten (W)-nickel (Ni)-silver (Ag) ternary alloy.

In other words, the element content ratio of the plated metal layer was changed from the ion content ratio of the plating solution, which is caused by plating workability of each metal.

Referring to Table 1, the metal layers formed of a tungsten (W)-nickel (Ni) binary alloy according to Examples 1 to 3 exhibited about 50% improved electrical conductivity compared with the metal layers including no tungsten (W) according to Comparative Examples 1 to 4. In addition, the metal layer formed of a tungsten (W)-nickel (Ni)-silver (Ag) ternary alloy according to Example 4 exhibited about 100% improvement and thus excellent electrical conductivity compared with the metal layers according to Comparative Examples 1 and 2.

The metal layers including tungsten (W) according to Examples 1 to 4 were not peeled off at all by an electrolyte solution compared with the metal layers according to Comparative Examples 1 to 4, and thus each electrode terminal respectively including the metal layers was suppressed from corrosion even when exposed to the electrolyte solution including a strong acid, a strong base, and the like.

Examples 1 to 4 showed about 4 times stronger adhesive force of an insulating sealant to a metal layer than Comparative Examples 1 to 4, and thus the electrode terminals according to Examples 1 to 4 may be applied to a polymer battery due to excellent adhesive properties.

On the other hand, Comparative Example 5 included tungsten in a metal layer, but the tungsten was included in a small content of less than 10 wt %, and specifically, 7 wt %. 54% of the area of the metal layer of the electrode terminal according to Comparative Example 5 was peeled off compared with the electrode terminals according to Examples 1 to 4.

On the contrary, Comparative Example 6 included a large tungsten content of greater than 80 wt %, and specifically, 86 wt %. The metal layer of Comparative Example 6 was welded with very low ultrasonic wave strength of 0.2 kgf compared with the electrode terminals according to Examples 1 to 4.

In other words, comparing Comparative Examples 5 and 6 with Examples 1 to 4, a metal layer should include, for example, greater than or equal to 10 wt %, greater than or equal to 12 wt %, greater than or equal to 14 wt %, greater than or equal to 16 wt %, or greater than or equal to 20 wt %, and for example, less than or equal to 80 wt %, less than or equal to 78 wt %, less than or equal to 76 wt %, less than or equal to 74 wt %, or less than or equal to 72 wt % in order to simultaneously exhibit excellent workability and corrosion resistance due to an ultrasonic wave welding process even though tungsten is included therein.

In other words, the electrode terminals according to Examples 1 to 4 were manufactured by forming a metal layer including a tungsten (W)-based alloy on a copper substrate and thus exhibited excellent electrical conductivity, corrosion resistance, and workability compared with a conventional electrode terminal coated with nickel (Ni), a nickel (Ni)-chromium (Cr) alloy, or a nickel (Ni)-zinc (Zn) alloy, or with only a tungsten-based alloy including tungsten in an amount of less than 10 wt % or greater than 80 wt %. Accordingly, the electrode terminal according to an embodiment may be used to realize an electro-chemical device having high power, high efficiency, and high durability, and an electro-chemical device module.

Manufacture of Lithium Ion Polymer Battery Cell

Example 5

100 g of graphite in a powder state was mixed with 10 g of polyvinylidene fluoride (PVdF) as a binder, and 100 ml of N-methylpyrrolidone (NMP) as a solvent was added thereto to prepare a slurry. The slurry was coated on both sides of a 10 μm-thick copper current collector and then dried and compressed to manufacture a negative electrode. The negative electrode had an entire thickness of 120 μm.

In addition, 100 g of LiCoO$_2$ in a powder state as an active material, 2 g of carbon black as a conductive agent, and 2 g of polyvinylidene fluoride (PVdF) as a binder were mixed, and 100 ml of N-methylpyrrolidone (NMP) as a solvent was added thereto to prepare a slurry. The slurry was coated on both sides of a 20 μm-thick aluminum current collector and then dried and compressed to manufacture a positive electrode. The positive electrode had an entire thickness of 200 μm.

After cutting the negative and positive electrodes into a predetermined size, so that a region not coated with the slurry out of each current collector might be protruded in one direction and respectively function as a positive electrode tab and a negative electrode tab, they were maintained in a 140° C. vacuum oven for 5 h and dried to have a moisture content of less than 1,000 ppm.

A plate-type electrode assembly having a consecutive negative electrode/separator/positive electrode/separator/negative electrode structure was manufactured by stacking a plurality of negative electrodes, a plurality of positive electrodes, and a plurality of separators through disposition of a 20 μm-thick porous polyethylene separator (W-Scope Corp.) between dried negative and positive electrodes.

Then, the positive electrode tabs respectively protruded from a plurality of positive electrodes were physically and electrically connected to an electrode terminal made of aluminum (Al) in an ultrasonic wave welding method. In addition, the negative electrode tabs respectively protruded from a plurality of negative electrodes were physically and electrically connected to an electrode terminal made of a tungsten (W) alloy according to Example 1 in an ultrasonic wave welding method.

Subsequently, a lithium ion polymer battery cell having 2 Ah level capacity was manufactured by housing the electrode assembly having a plate-type stacked structure in a pouch-shaped case having a groove and respectively attaching both sides of the electrode terminal connected to the positive electrode tab and the negative electrode tab and facing each other to the pouch case with a sealant film, injecting an electrolyte solution including 1.2M LiPF$_6$ in a mixed solvent of ethylene carbonate (EC):diethyl carbonate (DEC):methylethyl carbonate (MEC) in a volume ratio of 1:1:1 into the case, and sealing the case.

Example 6

A lithium ion polymer battery cell was manufactured in the same method as Example 5, except for using the electrode terminal according to Example 2 as a negative terminal.

Example 7

A lithium ion polymer battery cell was manufactured in the same method as Example 5, except for using the electrode terminal according to Example 3 as a negative terminal.

Example 8

A lithium ion polymer battery cell was manufactured in the same method as Example 5, except for using the electrode terminal according to Example 4 as a negative terminal.

Comparative Example 7

A lithium ion polymer battery cell was manufactured in the same method as Example 5, except for using the electrode terminal according to Comparative Example 1 as a negative terminal.

Comparative Example 8

A lithium ion polymer battery cell was manufactured in the same method as Example 5, except for using the electrode terminal according to Comparative Example 2 as a negative terminal.

Evaluation 7: DC Resistance of Lithium Ion Polymer Battery Cell

The lithium ion polymer battery cells according to Examples 5 to 8 and Comparative Examples 7 and 8 were discharged by 30% from a maximum charge with a discharge current of 1 C (2 A) by using a charge/discharger (Universal Material Technology Co., Ltd.), and then paused for 1 h to stabilize a voltage. Then, the lithium ion polymer battery cells were pulse-discharged with a discharge current of 5 C (10 A) for 10 s to obtain a voltage drop, DC resistance was calculated according to Ohm's law, and the results are shown in Table 2.

Evaluation 8: Discharge Characteristics of Lithium Ion Polymer Battery Cell

1 C and 5 C discharge capacities of the lithium ion polymer battery cells according to Examples 5 to 8 and Comparative Examples 7 and 8 were measured at room temperature, a ratio of the 5 C discharge capacity relative to the 1 C discharge capacity was calculated, and the results are shown in Table 2. In Table 2, the 1 C discharge capacity indicates capacity that the cells were respectively discharged for 1 h, and the 5 C discharge capacity indicates capacity that the cells were respectively discharged for ⅕ h.

TABLE 2

|  | Component element content ratio of negative terminal metal layer | DC resistance (mΩ) | 1 C discharge capacity (mAh) | 5 C discharge capacity (mAh) | 5 C discharge capacity/ 1 C discharge capacity (%) |
| --- | --- | --- | --- | --- | --- |
| Example 5 | tungsten:nickel 68:32 | 12.9 | 2,045 | 1,920 | 93.9 |
| Example 6 | tungsten:nickel 47:53 | 11.2 | 2,062 | 1,945 | 94.3 |
| Example 7 | tungsten:nickel 28:72 | 10.6 | 2,074 | 1,967 | 94.8 |
| Example 8 | tungsten:nickel:silver 47:44:9 | 9.4 | 2,085 | 2,012 | 96.5 |
| Comparative Example 7 | nickel 100 | 14.7 | 1,997 | 1,660 | 83.1 |
| Comparative Example 8 | nickel:chromium 73:27 | 16.5 | 1,965 | 1,435 | 73.0 |

Referring to Table 2, Examples 5 to 8 exhibited about 10 to 40% lower DC resistance than Comparative Examples 7 and 8 and thus had improved performance. In addition, the 1 C discharge capacity and the 5 C discharge capacity of Examples 5 to 8 had high power characteristics corresponding to 2000 mAh, and the ratios of the 5 C discharge capacity relative to the 1 C discharge capacity were in a range of 93.9% to 96.5% and thus about 10% to 30% improved high efficiency characteristics compared with Comparative Examples 7 and 8.

In other words, an electrode terminal having excellent electrical conductivity and corrosion resistance according to an embodiment may be used as a negative terminal to realize an electro-chemical device having high power and high efficiency.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrode terminal comprising:
   a copper substrate; and
   a metal layer covering at least one surface of the copper substrate,
   wherein the metal layer includes:
      greater than or equal to about 20 wt % and less than or equal to about 76 wt % of tungsten (W),
      nickel (Ni), and
      optionally, an additional metal selected from the group consisting of silver (Ag), gold (Au), platinum (Pt), zinc (Zn), iron (Fe), lead (Pb), tin (Sn), molybdenum (Mo), beryllium (Be), rhodium (Rh), iridium (Ir), and combinations thereof, and
   wherein the electrode terminal has an ultrasonic wave welding strength to a copper material of equal to or greater than 8.0 kgf.

2. The electrode terminal of claim 1, wherein the metal layer includes tungsten and nickel in a weight ratio of about 20:80 to about 70:30.

3. The electrode terminal of claim 1, wherein the additional metal is silver (Ag).

4. The electrode terminal of claim 3, wherein the metal layer includes tungsten, nickel, and silver (Ag) in a weight ratio of about 20 to 70:29 to 79:1 to 20.

5. The electrode terminal of claim 1, wherein a thickness of the metal layer is about 0.2 μm to about 5 μm.

6. The electrode terminal of claim 1, wherein the metal layer is a plated layer provided by electroplating or electroless plating.

7. The electrode terminal of claim 1, wherein the metal layer covers the entire surface of the copper substrate.

8. An electro-chemical device comprising the electrode terminal of claim 1.

9. The electro-chemical device of claim 8, wherein the electro-chemical device is a rechargeable lithium battery or a capacitor.

10. An electro-chemical device comprising:
    a plurality of electro-chemical devices; and
    a plurality of electrode terminals electrically connecting the electro-chemical devices, wherein the electrode terminal includes:
       a copper substrate, and
       a metal layer covering at least one surface of the copper substrate,
       wherein the metal layer includes:
          greater than or equal to about 20 wt % and less than or equal to about 76 wt % of tungsten (W),
          nickel (Ni), and
          optionally, an additional metal selected from the group consisting of silver (Ag), gold (Au), platinum (Pt), zinc (Zn), iron (Fe), lead (Pb), tin (Sn), molybdenum (Mo), beryllium (Be), rhodium (Rh), iridium (Ir), and combinations thereof, and
       wherein the electrode terminal has an ultrasonic wave welding strength to a copper material of equal to or greater than 8.0 kgf.

11. An electrochemical device module, wherein the plurality of electro-chemical devices of claim 10 are disposed in a matrix form.

12. The electrochemical device module of claim 11, wherein neighboring electro-chemical devices are coupled in series or in parallel in a first direction.

13. The electro-chemical device module of claim 11, wherein neighboring electro-chemical devices are coupled in series or in parallel in a second direction.

* * * * *